US 8,706,550 B1

(12) United States Patent
Chalawsky et al.

(10) Patent No.: US 8,706,550 B1
(45) Date of Patent: Apr. 22, 2014

(54) EXTERNAL-SIGNAL INFLUENCE ON CONTENT ITEM PERFORMANCE

(75) Inventors: Matt Chalawsky, Los Angeles, CA (US); Neil C. Rhodes, Redlands, CA (US); Bin Tian, Irvine, CA (US); Alexandr Y. Smolyanov, Rancho Santa Margarita, CA (US); Matthew S. Marzilli, Irvine, CA (US); Eugen C. Nistor, Aliso Viejo, CA (US); Xiaoli Chen, Irvine, CA (US)

(73) Assignee: Google Inc., Mountain View, CA (US)

(*) Notice: Subject to any disclaimer, the term of this patent is extended or adjusted under 35 U.S.C. 154(b) by 173 days.

(21) Appl. No.: 13/191,986

(22) Filed: Jul. 27, 2011

(51) Int. Cl.
*G06Q 30/00* (2012.01)
(52) U.S. Cl.
USPC .................... 705/14.41; 705/14.12
(58) Field of Classification Search
CPC ....................................... G06Q 30/00
USPC .................... 705/14.41, 14.49, 14.4
See application file for complete search history.

(56) References Cited

U.S. PATENT DOCUMENTS 7,222,127 B1 5/2007 Bem et al.
8,504,419 B2* 8/2013 Priyadarshan et al. ...... 705/14.4
2004/0073482 A1 4/2004 Wiggins et al.
2005/0137958 A1* 6/2005 Huber et al. ................. 705/37
2010/0057526 A1* 3/2010 Callahan et al. ............. 705/10

OTHER PUBLICATIONS

"What is the Google Prediction API?" [online]. Google Prediction API, Google 2010 [retrieved on Nov. 3, 2011]. Retrieved from the internet: <URL: http://web.archive.org/web/20100723154328/http://code.google.com/apis/predict/>.
"Getting Started Guide" [online] Google Prediction API, Google 2010 [retrieved on Nov. 3, 2011]. Retrieved from the internet: <URL: http://web.archive.org/web/20100522024504/http://code.google.com/apis/predict/docs/getting-started.html>.

* cited by examiner

*Primary Examiner* — John G Weiss
*Assistant Examiner* — Marilyn G Macasiano
(74) *Attorney, Agent, or Firm* — Leason Ellis LLP

(57) ABSTRACT

External-signal influence on content item performance is determined. Content item performance data is received that reflects historic performance of a content item for multiple presentations of the content item. Signal data is received that corresponds to at least one signal that is temporally correlated with the content item performance data and that is external to each user, publisher and content provider involved in any of the presentations. Using the content item performance data and the signal data, an influence value for the signal with regard to the content item is determined. A content item prediction model is modified based on the influence value.

18 Claims, 3 Drawing Sheets

EXTERNAL-SIGNAL INFLUENCE ON CONTENT ITEM PERFORMANCE

TECHNICAL FIELD

This document relates to external-signal influence on content item performance.

BACKGROUND

Advertising can occur in any of various different contexts. For example, ads are commonly included in: printed media such as newspapers and magazines; broadcast media such as radio and television content; and online media such as individual pages, portals and streamed content. Some advertising is done based on a "conversion"-type compensation model. In some online media, an advertiser who successfully bids on the placement of a particular ad agrees to pay an advertising fee for every user who clicks on (or otherwise activates) the ad and completes a predefined operation, for example purchasing a product or service, or establishing an account.

Ads are sometimes selected based on an ad prediction model. An ad serving organization may have a repository of hundreds of thousands of ads or more that are candidates for being served, and the organization uses the model to make a prediction about the effectiveness for individual ads. For example, the ad prediction model can be used to determine a predicted click-through rate for serving a particular ad on a page presented to a specific user.

SUMMARY

The present disclosure relates to using one or more external signals in selecting a content item (e.g., an ad) for presentation. Examples of external signals include, but are not limited to: weather, economy, particular events and trends. The influence of one or more external signals on the performance of a particular content item is determined using performance data, and can be quantified in one or more influence values. A prediction model is updated to take into account such influence, and one or more external signals are then obtained in real time and used by a content server as a factor in content selection.

In a first aspect, external-signal influence on content item performance is determined. Content item performance data is received that reflects historic performance of a content item for multiple presentations of the content item. Signal data is received that corresponds to at least one signal that is temporally correlated with the content item performance data and that is external to each user, publisher and content provider involved in any of the presentations. Using the content item performance data and the signal data, an influence value for the signal with regard to the content item is determined. A content item prediction model is modified based on the influence value.

Implementations can include any or all of the following features. The signal data corresponds to multiple signals, and the method further includes: determining a relative influence of each of the multiple signals; and assigning influence values to each of the multiple signals based on the determined relative influence. The content item performance data and the signal data are received, and the content item prediction model is updated, in real time. The signal is local to a geographic area, and the influence value is a local influence value. The method further includes weighting at least one of the local influence value and a national influence value in the content item prediction model. The signal includes at least one of a condition, an event, a community mood, a trend, an interest in a product or service, and combinations thereof. The method further includes using the modified content item prediction model to perform content item selection.

In a second aspect, a content item to be provided is selected. A content request to select at least one content item among multiple content items for presentation of the content item to a user is received, the content request associated with information. Signal data is received that corresponds to at least one signal that is temporally correlated with the content request and that is external to the user, to a publisher of the content item, and to each content provider of the multiple content items. The content item is selected among the multiple content items using at least the information and the signal data. The content item is provided in response to the content request.

Implementations can include a computer-implemented method, a computer program product, and/or a system, to name a few examples.

Implementations can include any or all of the following advantages. Prediction of content item performance can be improved by taking into account one or more external signals. Interpretation of content item performance data can be improved. Content item serving can be made more effective.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
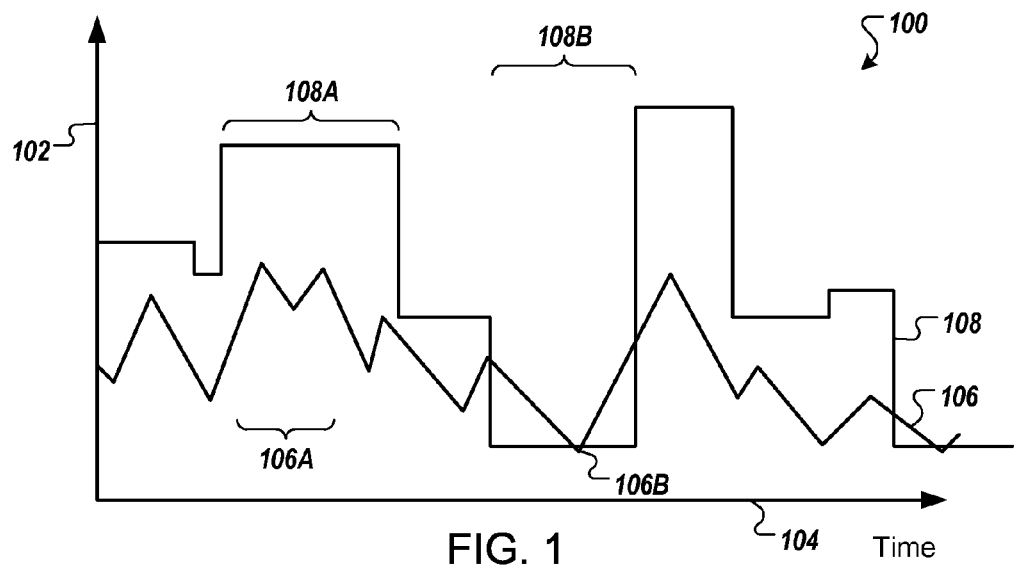
FIG. 1 shows a diagram that can be used for determining external-signal influence on content item performance.

FIG. 1 shows a diagram 100 that can be used for determining external-signal influence on the performance of one or more content items. Ads are described as an example of content in this situation. Some implementations, however, can instead or in addition involve one or more other types of content items including, but not limited to, media content, video, images, graphics, audio, text, and combinations thereof.

The diagram in this example presents data in one or more arbitrary units relative to a vertical axis 102, against time measured in an arbitrary unit on an axis 104. Here, a graph 106 represents ad performance data for a particular ad. In some implementations, ad performance data includes conversion data for one or more time periods. A conversion can be defined as corresponding to any user action that can be detected. For example, for an online ad, a conversion of a specific ad impression can be defined as the sequence of events where a user clicks on (or otherwise activates) the ad, the advertiser's page or other message is presented to the user, and the user takes at least one predefined action with regard to the advertiser (e.g., purchases a product or service, or establishes an account). That is, for each impression of an ad, one or more results can be registered, such as whether a successful purchase/registration was detected, whether the user at least clicked on the ad, or whether the user took no action with regard to the served ad. In some implementations, conversions are tracked without regard to any click by the user. Other ad performance data can be tracked, for example timing and/ or monetary amounts.

In some implementations, the graph 106 corresponds to a normalized conversion rate. For example, each value of the graph 106 can represent the percentage of ad impressions that lead to conversions at the given time. In other implementations, the graph 106 can represent raw ad performance data, such as, but not limited to, the total number of conversions detected per time interval. Any suitable time interval can be used, including the number of conversions per second, minute, hour, day, week, month, or year, to name just a few examples.

It can be observed that the graph 106 in this example shows a conversion rate that varies over time. To some extent, such variance can depend on one or more factors. For example, individual users' personal preferences (e.g., what products or services interest them, or the likelihood that they will react to an ad) can fluctuate or change. As another example, the types of contexts where the ad is most frequently perceived (e.g., in professional environments, or in casual social settings) can depend on the time of day or the day of the week. Factors that depend on one or more of the user, the advertiser and the publisher of the ad, are sometimes considered relevant, or believed to be relevant, to the expected performance of an ad. For this reason, one or more such factors are taken into account in some ad selection processes.

Here, another factor will also be evaluated as a possible influence on the performance of individual ads. This factor relates to one or more signals that are external to the user(s), advertiser(s) and publisher(s) and are therefore referred to as external signals. An example of an external signal is weather. Assume, for example, that weather in this implementation is quantified as the outdoor temperature for a given city or other geographic location. The weather as an external signal can therefore be taken into account by collecting signal data, for example by registering the published temperature reports by national or local weather services for the geographic location.

The signal for weather can at least in part depend on the location of the user to whom the content item (e.g., an ad) is to be presented. If the user is currently located in Mountain View, Calif., then the weather signal can reflect the current weather conditions (and/or forecast) for that location, or for the San Francisco Bay Area, or for California in general, to name just a few examples. Other weather signals can be used that are more specific or more general than the previous examples.

That is, the current location can affect which weather signal is taken into consideration, but it is not the location itself that is directly taken into account when the external signal is used, but rather the weather information regarding that location. Also, while the weather signal in this example depends on the user in the sense that the user's location matters, the signal is considered external to the user because the user has no direct control over the weather conditions.

Here, the diagram 100 includes a graph 108 that represents signal data for outdoor temperature, measured in a suitable unit such as degrees Fahrenheit. It can be observed that the graph 108 shows the weather signal as varying over time. For example, this reflects the natural temperature variations due to weather conditions, between day and night, seasonal temperature variations, and/or any other temperature variations.

The time of day (or night) can also have other effects than temperature change. For example, fewer users may be active at night than during daytime. A measure of conversion rate may not be significantly affected by this decrease (e.g., because the click rate decreases by a comparable amount). However, other measures could be affected, including, but not limited to, conversions per time. Accordingly, some implementations can take into account one or more external signals that affect multiple factors regarding the content presentation.

In some implementations, one or more signals can be based on discretized data. A continuous range of weather temperature data ranging from −40° F. to +120° F. can be discretized into an arbitrary number of groups. For example, the range can be split into a relatively small number of groups, such as {very cold, cold, comfortable, warm, hot}. In implementations that can handle continuous signal data, discretization can be omitted or made optional.

The ad performance data and the signal data are temporally correlated, for example such that the graph 106 corresponds to a time interval that is essentially the same as the time interval for the graph 108. That is, if the influence hypothesis being evaluated is whether the weather conditions occurring simultaneously with the ad impression affect the ad's performance at that geographic location, then the external signal to be considered is that of the weather conditions for the time period of the ad performance data.

In the current example, which is used for purposes of illustration only, some potential evidence of correlation can be seen in the diagram 100. For example, two local maxima 106A of the ad performance data appear in the time interval when the signal data has a local maximum 108A. As another example, a global minimum 106B of the ad performance data is contemporaneous with a global minimum 108B of the signal data.

The terms "local" and "global" in this context are relative to the respective bodies of data. For example, with conversion rate as defined in this example the absolute minimum that can occur is zero, when none of the ad impressions during a particular time result in a conversion. Similarly, the absolute maximum with this definition of conversion rate is one (i.e., 100%), when each ad impression results in a conversion. Against this background, the local and global maxima (and minima) in the ad performance data occur in the range defined by these extreme values. For other types of performance data, absolute maxima or minima may not exist.

Influence can be determined using one or more statistical methods. In some implementations, one or more correlations between ad performance data and signal data are sought. For example, the correlation between the ad performance data and signal data can be determined by dividing their covariance with the product of their respective standard deviations. That is, if the ad performance data is represented by a variable P, and the signal data by a variable S, then the correlation between them can be defined as:

$$\text{correlation}(P,S) = \text{covariance}(P,S)/(\sigma_P \sigma_S)$$

where $\sigma_P$ and $\sigma_S$ are the respective standard deviations for the ad performance data and the signal data. The covariance can be defined as:

$$\text{covariance}(P,S) = E[(P-E(P))(S-E(S))]$$

where E is the expectation value.

In some implementations, the correlation between the ad performance data and signal data is used to define an influence value that indicates how the external signal apparently affects the ad performance. In so doing, it must be considered that a mere correlation between two entities does not imply a strict causal relationship between them. That is, just because a particular ad is seen to perform better when served in high-temperature weather does not mean that high temperatures cause the improved performance. Accordingly, the use of the term "influence" here does not signify that a causal relationship must have been established or is even plausible; rather, a correlation between the external factor and conversion rate is said to be an influence on the ad performance because it signifies that the variables tend to be observed together, to a greater or lesser degree, as the case may be. As mentioned above, statistical methods are used to determine whether one or more external signals appear to influence the performance of a particular ad, and such statistical analysis may proceed beyond the point of establishing a correlation.

Any suitable external signal can be used. For example, and without limitation, weather as an external signal can be defined as including one or more actual and/or forecast values regarding: temperature; precipitation, such as rain, snow or hail; cloud coverage; sunniness; thunderstorms; lightning; air pressure; humidity; dew point; wind speed; wind direction; visibility, such as the presence of fog or dust storms; and natural disasters, such as tornadoes or hurricanes. An external signal sometimes depends on one or more other external signals through a relationship that may or may not be known or fully understood. Nevertheless, any external signal that is determined to have an influence on the performance of one or more content items can be useful in a predictive model.

The weather signal(s) can be quantified in any suitable way. For example, precipitation can be represented in numerical form as the amount of rain that has been detected over the N most recent minutes or hours or days, measured in inches. As another example, wind speed can be quantified as the numerical value currently reported by a selected anemometer. As yet another example, the presence or absence of lightning can be quantified using a binary variable, such as a Yes/No flag.

Many other types of external signals can be used. In some implementations, economic or financial conditions or events are used as external signals. Examples of such signals include, but are not limited to: a financial-market index, such as the Dow Jones Industrial Average index; a rate, such as the federal funds rate; labor market statistics, such as unemployment rates; inflation or deflation rates; currency exchange rates; market statistics, such as the Gross National Product; court proceedings, such as bankruptcies; housing market data, such as construction or foreclosures; and a price index, such as the Consumer price index.

In some implementations, one or more events of cultural, historical or social nature can be taken into account. Examples of such external signals include, but are not limited to: holidays, such as Mother's Day or Memorial Day; national events, such as the presidential election; sporting events, such as national championships; and cultural events, such as award show broadcasts.

In some implementations, a demonstrated interest (or lack thereof) in a product or service can be taken into account as an external signal. For example, and without limitation, one or more sources of consumer-interest data can be identified and used as a signal, such as the Google Trends search query data service offered by Google Inc. and currently available at www.google.com/trends. Such interest data can reflect a relative popularity of a particular product. For example, if available data shows an interest in coupons (e.g., when a search engine receives many searches for the term "coupons"), this external signal can be taken into account, such as by giving coupon advertisements a higher rating when predicting ad performance.

In some implementations, one or more other signals can be defined and evaluated. For example, the "mood" of a community can be determined, such as by evaluating the Google Trends service and/or obtaining data from a social networking service. This and/or other such signals can be quantified in any suitable way. In some implementations, one or more variables can be defined to represent some characteristic or property of a community. For example, such signals can take into account the community's demonstrated level of interest in one or more topics, including, but not limited to: politics, the economy, religion, technology, sports, education, new products, fashion, relationships, celebrities, cooking, pets, and outdoor activities. A signal can be defined as a one-dimensional variable, for example as an index that reflects the community's current interest in sports relative to its interest in sports on some reference date, or relative to a national average. As another example, a multidimensional variable can be created that contains values for two or more signals, such as for sports and new products.

When community mood or any other signal is considered, privacy rights of users are respected. For example, privacy policies regarding how information is collected and/or used can be created and enforced. An implementation can be designed as an "opt-in only" regime, such that the implementation will only be used for persons who have explicitly agreed to participate. As another example, an "opt-out" regime gives users the right and ability to decline participation.

In some implementations, the identities of users are protected by use of one or more anonymization processes. In some implementations, certain information associated with users is anonymized or partially redacted. For example, user history and login association, or device history and address association, can be anonymized by use of collision-resistant hashes that hash the identification data. For example, user identities (such as user names or user electronic mail addresses) can be replaced in whole or in part with a numerical string; user Internet Protocol addresses can be processed to eliminate some information such as, for example, the class C and class D subdomain information; user browsing history can be disassociated with a particular user identity and replaced with a user interest category; and user interest categories can be generalized to minimize association with specific user identities or user browsing histories, and the like. Additional privacy protection techniques can also be used, such as the use of one or more encryption processes.

Signal data can be refined, aggregated, scaled and/or enhanced in one or more ways. In some implementations, signal data is normalized. For example, signal data of a specific nature is classified in one or more general categories, such as by classifying a demonstrated interest in the Los Angeles Lakers as a signal for "basketball" or "sports." As another example, raw data is compared to a reference value to generate relative data.

In some implementations, one or more external signals indicate a rate of change in some entity. For example, the rate of change in the unemployment level, or in barometric pressure, can be taken into account. A rate of change can be indicated in absolute terms (e.g., by the number of units that the entity changes per time period) or in relative terms (e.g., as the positive or negative percentage by which the entity changes per time period).

In some implementations, one or more external signals reflect a prediction of some entity. For example, the prediction for tomorrow's temperature, or for next month's air pollution levels, can be taken into account. The temporal correlation between such a signal and the ad's performance data can then relate to when the prediction was made, or when the prediction was published, as opposed to the time to which the prediction applies (e.g., tomorrow or next month). Forecasts or other predictions can be obtained from one or more public or private sources including, but not limited to, the National Weather Service or other agencies, news media or financial market analysts.

External signals can relate to geographic regions of any size and/or location. For example, an external signal can be global (i.e., it relates to the entire world) or local (e.g., the signal relates to the weather conditions near a particular meteorological station). Some signals can be determined at any level of geographic granularity, such as the demonstrated sports interest of the entire population vis-à-vis that of the people enrolled at a particular university or residing in a particular city. In some implementations, a local signal is weighted more heavily than a corresponding national signal.

Figure 2:
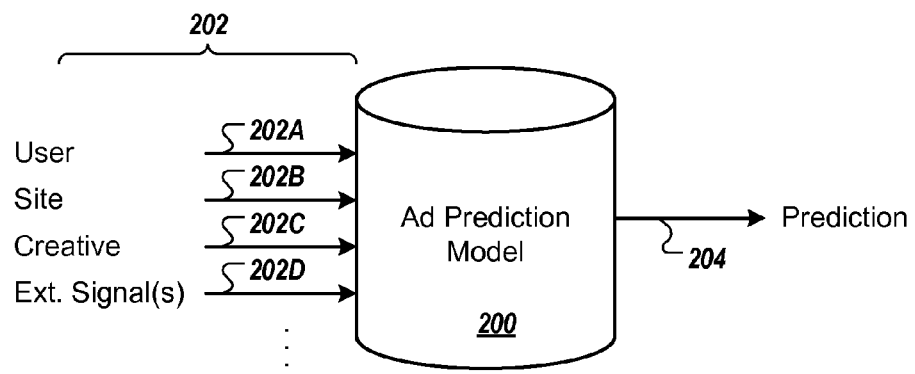
FIG. 2 schematically shows a content item prediction model.

FIG. 2 schematically shows an ad prediction model 200. The performance prediction in this example relates to ads, but in other implementations the prediction can additionally or instead relate to one or more other types of content items.

The ad prediction model 200 takes as its input one or more signals 202 and generates an output 204 that includes one or more predictions. Here, the examples of the signals 202 include: a user signal 202A, such as an identifier representing some demographic data; a site signal 202B, such as the name of the page on which the ad is being displayed (e.g., www.ExamplePublisherWebsite.com), or the category that the site belongs to (e.g., consumer-electronics enthusiasts blogs); a creative signal 202C, such as an identifier or other name for the particular ad that is eligible for selection and presentation to users; and an external signal 204D, such as any of the signals mentioned above. Other signals can be used.

The ad prediction model 200 takes into account each of the signals 202 according to the current parameter(s) of the model. This can involve placing a large significance on one or more signals, for example by weighting that signal more than the other signal(s). In an illustrative example, when the site signal 202B indicates that content is to be presented on site X, this can cause the ad prediction model 200 to give a stronger preference to ads from category Y. In some situations, little or no significance can be placed on a particular signal, for example such that for predictions about ad Z, the ad prediction model 200 gives no influence to (i.e., disregards) external signal W. The model can use one or more influence values for each external signal, for example determined as described earlier herein.

A combined effect of two or more influence values can be taken into account. In some implementations, for particular combinations of signal values (e.g., a specific site identifier and a specific external signal) the ad prediction model 200 can make a different prediction than when only one (or none) of these particular signal values is present. For example, an advertiser can specify that one or more combined effects should be taken into account.

In some implementations, a control is provided for the advertiser that allows selection of: 1) a universal factor applied to all effects of external signals, such as 0.5 (e.g., so this advertiser can choose to use the external signals less across the board compared to other advertisers), and 2) a threshold influence level that a signal must have before it is used at all (e.g., so that signals with little influence are ignored completely and only very strong signals are used).

Figure 3:
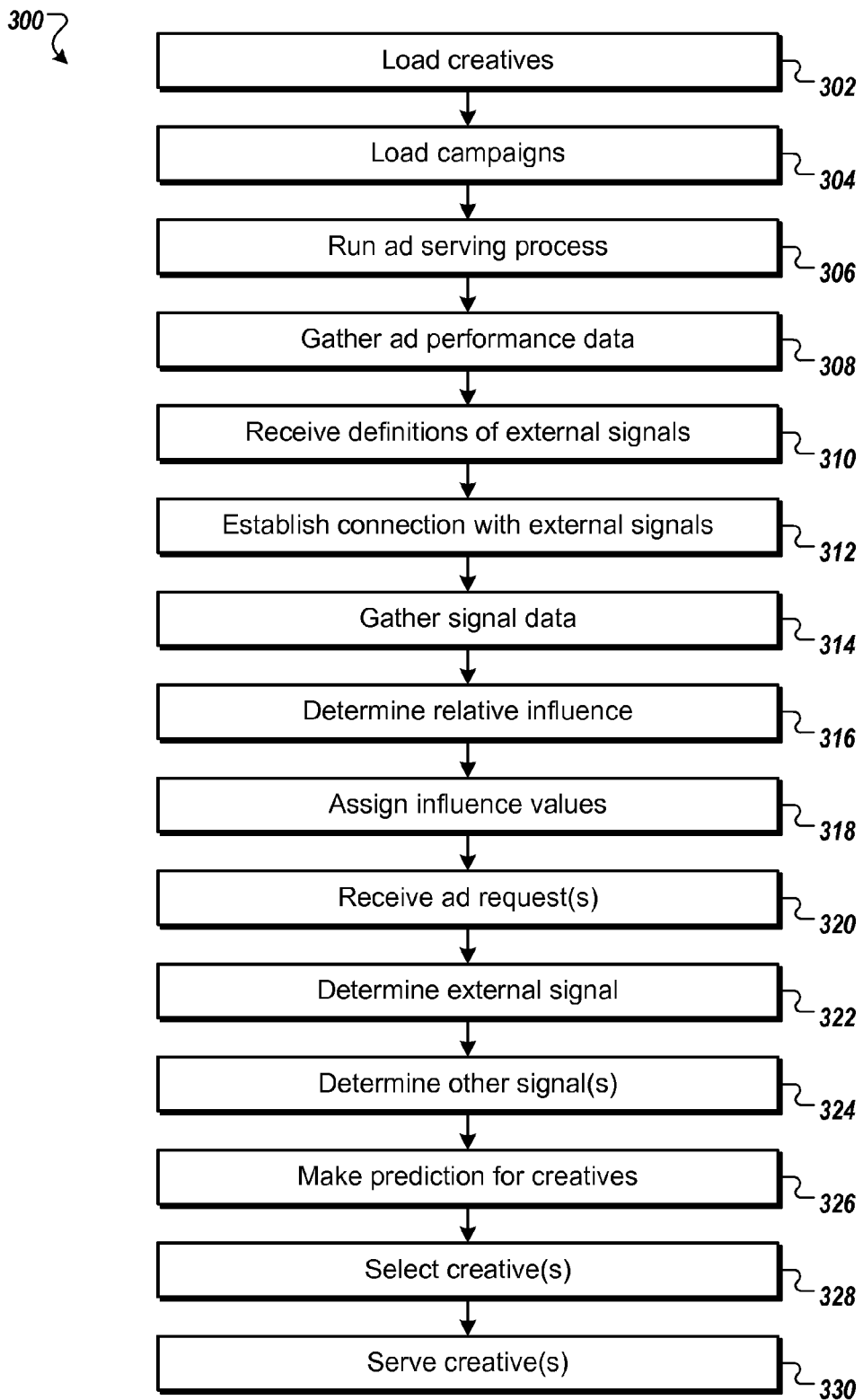
FIG. 3 is a flowchart of a method.

FIG. 3 is a flowchart of a method 300. The method 300 can be performed by a processor executing instructions stored in a computer-readable storage medium, for example in a computer system operated by an organization that selects and provides ads for publication. In some implementations, one or more steps can be performed in a different order. As another example, one or more steps can at least in part be performed in parallel with each other.

At 302, creatives are loaded into a system. Creatives can include ads and/or any other type of content item. In some implementations, an ad serving organization from time to time loads creatives, forming and maintaining a database of ads, in a process where advertisers can bid on the opportunity to present their respective ads in specified situations. Over time, creatives are updated or removed, and new ones added, depending on the circumstances.

At 304, one or more campaigns are defined in the system. For example, an advertiser specifies an ad campaign regarding one or more particular ads. The ad campaign can set forth a maximum and/or a target number of impressions (e.g., per time, per publisher, per user). In some implementations, as part of defining the campaign the advertiser can specify that it bids a higher amount than otherwise to show its ads during a specific week, and during that time particularly to display the ads on a group of selected sites that are the top priority for this advertiser. The ad server takes such campaign(s) into account when choosing which advertisers will be eligible for ad presentation.

At 306, an ad serving process is initiated and run, either indefinitely or for a specified time. For example, the ad serving organization has agreements with a number of publishers that the ad serving organization will supply ads for ad slots defined by the publishers, and advertisers are invited to bid for the corresponding advertising opportunities. In some implementations, at least part of the ad serving process relates to search engines, for example such that one or more ads are selected in response to a search query and presented on the same page(s) as the search results.

Based on the particular ad-serving arrangements, an ad that was selected for publication and subsequently presented is said to have had a certain number of impressions (i.e., an ad impression is reported whenever an individual ad is displayed).

At 308, ad performance data is gathered. For example, the number of impressions, click-through events, and/or conversions for each ad is tracked. In some implementations, the ad serving organization receives conversion data from the advertiser (or from another entity to which the ad directs the user), and uses this to determine the respective performance of each ad. For example, the graph 106 (FIG. 1) represents gathered performance data.

At 310, definitions of one or more external signals are received. For example, any or all of the external signals mentioned herein can be used. The external signal definition(s) can be updated over time.

At 312, connection with the external signal(s) is established. In some implementations, the computer system is provided with a script or other program that retrieves the necessary signal data. The system can establish continuous or on-demand access to one or more of weather data, stock market data, social-network data, and news data, to name just a few examples.

At 314, signal data is gathered. For example, the current weather conditions, stock market index, or community trend are determined. In some implementations, one or more feeds (e.g., RSS) are used to obtain signal data. The system can process the obtained data in one or more ways to obtain the signal data.

At 316, the relative influence of multiple external signals is determined. In some implementations, it can be determined what correlation each of the external signals has with the data that is represented by the graph 106 (FIG. 1). For example, the respective temporal variations in the external signals can be analyzed to determine which of the signals correlate more, or less, strongly with the ad performance data. Assume, for example, that the performance data has been gathered for a specific ad X, and that external signals A-E are being considered as possibly having an influence on X's performance. The determination can lead to the following result:

| External signal | Influence value on ad X | Relative influence value on ad X |
|---|---|---|
| A | $f_A(X, \ldots)$ | 50% |
| B | $f_B(X, \ldots)$ | 11% |
| C | $f_C(X, \ldots)$ | 8% |
| D | $f_D(X, \ldots)$ | 18% |
| E | $f_E(X, \ldots)$ | 13% |

That is, first, the external signal is determined to have an influence that depends on which the ad X is, as well as other factors. Here, this is represented by the expression $f_A(X, \ldots)$. For example, weather as an external signal may correlate with the performance of cruise ship ads, but not necessarily with ads for jewelry. The influence $f_A(X, \ldots)$ can then vary depending on the current "value" (in a general sense) that the external signal has.

Some correlations can reflect an observed influence on the general population by a certain person, organization or artistic work, etc. For example, a visit by the head of state of a particular country may inspire the public to don certain clothing, such as hats. In that situation, the upcoming visit can be used as an external signal with regard to ads (or other content) regarding that type of clothing.

At 318, respective influence values are assigned based on the determined influences. The influence value can be specified using any suitable unit, or as a dimensionless entity. The influence values are used in modifying or creating an ad prediction model. For example, the ad prediction model 200 (FIG. 2) can be updated to reflect the relative importance of any or all of the external signals A-E above.

Relative influence between two or more external signals can be determined. Here, the external signal A's influence relative to the other external signals being considered (B-D) amounts to 50%, meaning that the other external signals are together considered to have the remaining 50% of influence. That is, for the five external signals A-E, it has been found based on the ad performance data and the signal data that the signal A appears to have significantly stronger influence (i.e., has a relatively stronger correlation with) the performance data for ad X than the other external signals.

Many different external signals can exist for any given ad, and some such signals may not currently be fully known or understood. For this reason, an external signal that is currently found to be a relatively strong influence on the performance of a given ad, can later be superceded by one or more newly discovered or defined external signal that had not previously been taken into account.

At 320, one or more ad requests are received. For example, this is done as part of running the ad serving process that was initiated above at 306.

At 322, one or more external signals 202D are determined for use in responding to the ad request. This is done using the connection(s) established above at 312. For example, weather data, stock market data, social-network data, and/or news data are obtained.

At 324, one or more other signals are determined. For example, the ad request seeks an ad to be displayed on a specific page that is being generated for a user associated with certain demographic information, and this information can be obtained as signals 202A, B and C (FIG. 2).

At 326, a prediction for one or more creatives can be made. In some implementations, the ad prediction model 200 (FIG. 2) is used. For example, the following predictions can be generated:

| Creative | Predicted click-through rate (CTR) |
|---|---|
| $X_1$ | $CTR_1$ |
| $X_2$ | $CTR_2$ |
| $X_3$ | $CTR_3$ |
| $X_4$ | $CTR_4$ |
| $X_5$ | $CTR_5$ |
| $X_6$ | $CTR_6$ |

That is, for each of the ads $X_1$-$X_6$, a predicted conversion value $CTR_1$-$CTR_6$, such as a click-through rate, can be generated.

At 328, one or more ads (or other content items) are selected based at least in part on the external signal. For example, if an advertiser's bid amount is conditioned on one or more external signal values, then the applicable bid amount is determined using the external signal and taken into account in the auction. As another example, when the ad selection is done in response to a search query the ad having the highest predicted conversion value can be selected. Combinations of these approaches can be used in some implementations.

At 330, the selected ad is served. For example, the ad serving organization forwards the ad for receipt by the user's device, from which device the ad request may have been generated. As another example, the ad serving organization forwards a pointer (e.g., a link) referencing the ad to a recipient who uses the pointer to access the ad (or other content). On the user's device, an applicable script or other code ensures that the ad is presented in a specified way, such as in a particular ad slot on a displayed page.

Figure 4:
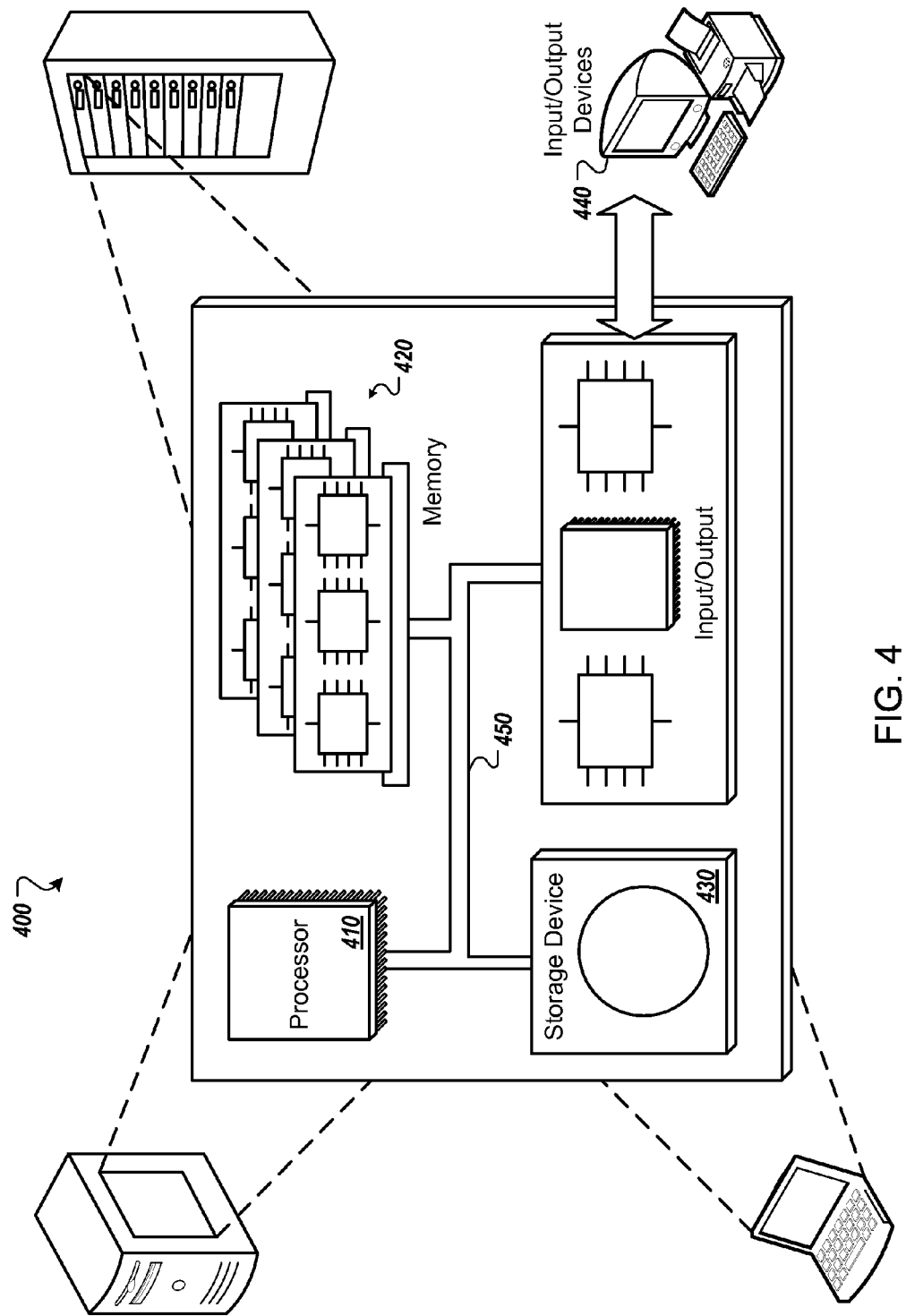
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The fact that the computer program product is tangibly embodied signifies that the information carrier (e.g., the machine-readable storage device) is a non-transitory medium. Non-transitory media do not include transitory propagating signals, for example. Nevertheless, non-transitory media may change over time. For example, a state, condition, location, or other attribute or the non-transitory media may change or be changed. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for selecting a content item to be provided, the method comprising:
   receiving, by a connection to a communication network, a content request to select at least one content item among multiple content items for presentation of the content item to a user;
   receiving, by a connection to a communication network, content item performance data that reflects historic performance of a content item for multiple presentations of the content item;
   receiving, by a connection to a communication network, signal data corresponding to at least one signal that is temporally correlated with the content request and that is external to the user, to a publisher of the content item, and to each content provider of the multiple content items;
   determining based on one or more correlations between the content item performance data and the signal data, an influence value for the at least one signal with regard to the content item, using a processor executing instructions stored in a computer-readable storage medium;
   modifying, using the processor executing instructions stored in the computer-readable storage medium, a content item prediction model based on the influence value;
   selecting, using the processor executing instructions stored in the computer-readable storage medium, the content item among the multiple content items using the modified content item prediction model; and
   providing, by a connection to a communication network, the content item in response to the content request.

2. The computer-implemented method of claim 1, wherein the at least one signal includes at least one of a condition, an event, a community mood, a trend, an interest in a product or service, and combinations thereof.

3. The computer-implemented method of claim 1, further comprising the step of discretizing the signal data into an arbitrary number of groups and wherein the selecting step uses at least the information and the discretized signal data.

4. The computer-implemented method of claim 1, wherein the content request is received from a user device and wherein the content item is provided to the user device in response to the content request.

5. The computer-implemented method of claim 4, further comprising the step of forwarding a pointer to the user device and wherein the content item is provided to the user device using the pointer to access the content item.

6. The computer-implemented method of claim 1, wherein the signal data corresponds to multiple signals, the method further comprising:
   determining a relative influence of each of the multiple signals; and
   assigning influence values to each of the multiple signals based on the determined relative influence.

7. The computer-implemented method of claim 1, wherein the content item performance data and the signal data are received, and the content item prediction model is updated, in real time.

8. The computer-implemented method of claim 1, wherein the at least one signal is local to a geographic area, and the influence value is a local influence value.

9. The computer-implemented method of claim 8, further comprising weighting at least one of the local influence value and a national influence value in the content item prediction model.

10. A computer program product tangibly embodied in a non-transitory computer-readable storage medium and comprising instructions that when executed by a processor perform a method for determining external-signal influence on ad performance, the method comprising:
   receiving a content request to select at least one content item among multiple content items for presentation of the content item to a user;
   receiving content item performance data that reflects historic performance of a content item for multiple presentations of the content item;
   receiving signal data corresponding to at least one signal that is temporally correlated with the content request and that is external to the user, to a publisher of the content item, and to each content provider of the multiple content items;
   determining based on one or more correlations between the content item performance data and the signal data, an influence value for the at least one signal with regard to the content item;
   modifying a content item prediction model based on the influence value;
   selecting the content item among the multiple content items using the modified content item prediction model; and
   providing the content item in response to the content request.

11. The computer program product of claim 10, further comprising the step of discretizing the signal data into an arbitrary number of groups and wherein the selecting step uses at least the information and the discretized signal data.

12. The computer program product of claim 10, wherein the content request is received from a user device and wherein the content item is provided to the user device in response to the content request.

13. The computer program product of claim 10, further comprising the step of forwarding a pointer to the user device and wherein the content item is provided to the user device using the pointer to access the content item.

14. The computer program product of claim 10, wherein the signal data corresponds to multiple signals, the method further comprising:
   determining a relative influence of each of the multiple signals; and
   assigning influence values to each of the multiple signals based on the determined relative influence.

15. The computer program product of claim 10, wherein the content item performance data and the signal data are received, and the content item prediction model is updated, in real time.

16. The computer program product of claim 10, wherein the at least one signal is local to a geographic area, and the influence value is a local influence value.

17. The computer program product of claim 16, further comprising weighting at least one of the local influence value and a national influence value in the content item prediction model.

18. The computer program product of claim 10, wherein the at least one signal includes at least one of a condition, an event, a community mood, a trend, an interest in a product or service, and combinations thereof.

* * * * *